United States Patent
Yoshida et al.

(10) Patent No.: US 7,481,298 B2
(45) Date of Patent: Jan. 27, 2009

(54) LUBRICATING STRUCTURE OF HYDROSTATIC CONTINUOUSLY VARIABLE TRANSMISSION

(75) Inventors: Yoshihiro Yoshida, Saitama (JP); Toshimasa Mitsubori, Saitama (JP); Kenji Sakakibara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 537 days.

(21) Appl. No.: 11/347,199

(22) Filed: Feb. 6, 2006

(65) Prior Publication Data
US 2006/0174759 A1 Aug. 10, 2006

(30) Foreign Application Priority Data
Feb. 8, 2005 (JP) ............................. 2005-032127

(51) Int. Cl.
*F01M 1/00* (2006.01)
(52) U.S. Cl. .................. 184/6.12; 184/6.6; 184/7.4; 476/8
(58) Field of Classification Search .............. 184/14, 184/6, 6.6, 6.12, 7.4; 476/8, 40
See application file for complete search history.

(56) References Cited

U.S. PATENT DOCUMENTS

| | | | | |
|---|---|---|---|---|
| 4,402,181 A | * | 9/1983 | Acker et al. | 60/427 |
| RE33,126 E | * | 12/1989 | Wittke | 475/218 |
| 4,916,901 A | * | 4/1990 | Hayashi et al. | 60/489 |
| 5,575,152 A | * | 11/1996 | Folsom | 60/492 |
| 7,231,765 B2 | * | 6/2007 | Kawamura et al. | 60/487 |

FOREIGN PATENT DOCUMENTS

| | | |
|---|---|---|
| EP | 0 574 915 A1 | 12/1993 |
| JP | 61-278656 A | 12/1986 |
| JP | 63-140173 A | 6/1988 |
| JP | 9-100909 A | 4/1997 |
| JP | 2002-54734 A | 2/2002 |

* cited by examiner

*Primary Examiner*—David M Fenstermacher
(74) *Attorney, Agent, or Firm*—Birch, Stewart, Kolasch & Birch, LLP

(57) ABSTRACT

A lubricating structure for a hydrostatic continuously variable transmission. The structure includes an oil path arranged at an outer circumferential side of a clutch valve, and a lubricant oil ejection hole communicating with the outer circumferential side oil path of the clutch valve and formed in the transmission shaft toward the outer circumference of the transmission shaft. In addition, the structure includes a communicating oil path that is also formed in the transmission shaft for communicating between an oil feeding passage communicating with an lubricant oil feeding source and the outer circumferential oil path of the clutch valve. A single orifice is arranged in the communicating oil path, rather than in the lubricant oil ejection hole. This configuration provides for efficient manufacturing and a high degree of freedom in setting of the lubricant oil ejection hole.

20 Claims, 9 Drawing Sheets

FIG. 7(a)
FIG. 7(b)
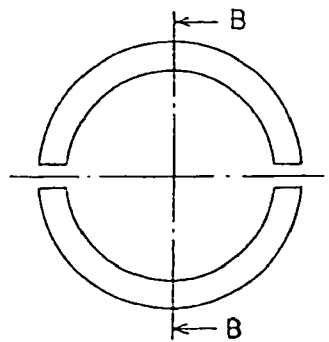
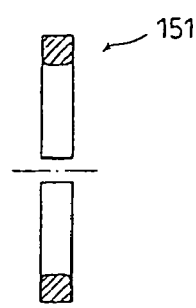
FIG. 8(a)
FIG. 8(b)
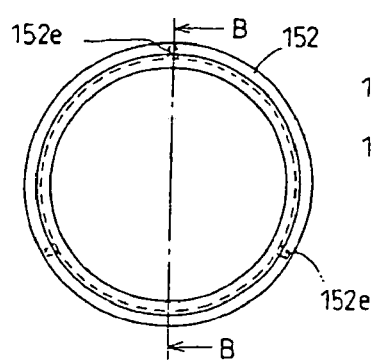
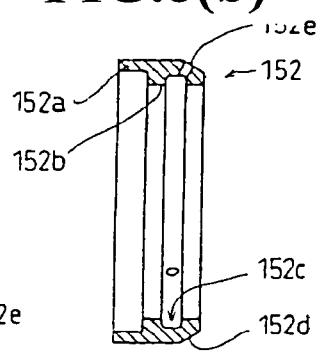
FIG. 9(a)
FIG. 9(b)
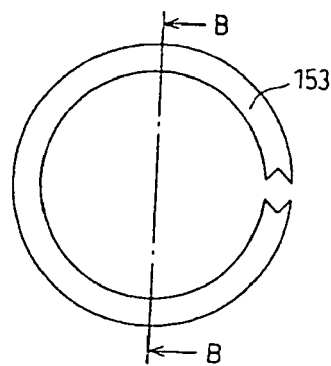
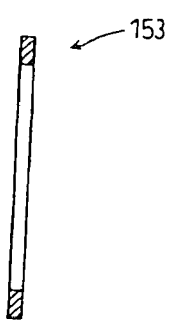

US 7,481,298 B2

LUBRICATING STRUCTURE OF HYDROSTATIC CONTINUOUSLY VARIABLE TRANSMISSION

CROSS-REFERENCE TO RELATED APPLICATION

The present application claims priority under 35 U.S.C. §119 to Japanese Patent Application No. 2005-032127, filed Feb. 8, 2005, the entire contents of which are hereby incorporated by reference.

BACKGROUND OF THE INVENTION

1. Field of the Invention

This invention relates to a lubricating structure of a hydrostatic continuously variable transmission and more particularly a structure of oil path for use in ejecting lubricant oil from a transmission shaft to a rotary sliding part such as a slant plate in the hydrostatic continuously variable transmission.

2. Description of Background Art

In the prior art hydrostatic continuously variable transmission, there have been provided a plurality of diametrical lubricant oil ejection holes directed from the central oil path at the transmission shaft formed axially at the center of the transmission shaft toward the outer circumferential part of the transmission shaft in order to eject the lubricant oil from the transmission shaft to the rotary sliding part such as a slant plate and the like (for example, refer to JP-A No. 54734/2002 (FIG. 2) and JP-A No. 100909/1997 (Reference symbol 77, FIG. 2)).

The lubricant oil ejection holes are holes of relative fine diameter. As described above, arrangement of a plurality of holes of fine diameter at a thick-wall part of the transmission shaft generated a reduced productivity of the transmission, since holes with very fine diameters could not be produced, which resulted in feeding more than a requisite amount of oil. In addition, even if the hole of fine diameter could be machined, feeding of oil to an appropriate location required an increased number of holes. This was not preferable because it resulted in increasing the volume of the oil pump.

SUMMARY AND OBJECTS OF THE INVENTION

This invention provides a structure of lubricant oil ejection passage that can be manufactured efficiently and show a high degree of setting of the lubricant oil ejection holes.

This invention resolves the aforesaid problem. A first aspect of the invention includes a lubricating structure of a hydrostatic continuously variable transmission in which a hydraulic circuit including a high pressure oil path for feeding working oil from a hydraulic pump to a hydraulic motor and a low pressure oil path for feeding working oil from said hydraulic motor to said hydraulic pump is constituted within a cylinder integrally formed with a transmission shaft between said hydraulic pump and said hydraulic motor within a casing rotated by a driving source. A clutch valve arranged in the transmission shaft is slid to make a shortened state between said high pressure oil path and said low pressure oil path so as to change over a transmittance of power force.

An oil path is arranged at an outer circumferential side of said clutch valve, and a lubricant oil ejection hole communicates with the oil path at the outer circumferential side of said clutch valve and is formed in the transmission shaft toward the outer circumferential side of said transmission shaft. In addition, a communicating oil path is also formed in the transmission shaft to cause an oil supplying oil path communicating with a lubricating oil supplying source to communicate with the oil path at the outer circumferential side of said clutch valve. Further, an orifice is arranged in the communicating oil path.

According to a second aspect of the invention, the oil path at the outer circumferential side of said clutch valve has an annular shape. In addition, only one communicating oil path having the orifice is provided, whereas multiple lubricant oil ejection holes may be provided.

According to the first aspect of the invention, the orifice arranged in the communicating oil path is used for controlling a flowing-out amount of lubricant oil. A part of the communicating oil path has a relatively large diameter. Thus, machining an orifice with a small diameter can be easily carried, making it possible to control the ejection amount of lubricant oil. Since the lubricant ejection oil hole is provided at the extremity end of the oil path, of which oil amount is controlled by the orifice, an ejection hole with a large diameter can be formed. Further, a certain degree of freedom can be generated for setting the hole angle, the hole direction, and the number of holes, resulting in improved lubrication of a slant plate or the like. The lubricant oil is ejected from the ejection hole of large diameter into the transmission with a centrifugal force generated by a rotation of the transmission shaft. A large diameter ejection hole can be easily machined, as compared with the prior art arrangements which have fine diameter lubricant oil ejection holes.

According to the second aspect of the invention, because only one communicating oil path with an orifice is provided for adjusting an oil supplying amount, the diameter of the single orifice can be increased, the process of machining and the process of controlling an oil amount controlling are improved as compared with conventional arrangements having the orifice at a respective lubricant oil ejection hole. At the same time, a plurality of ejection holes can be easily arranged, because the lubricant oil ejection holes can be arranged to pass through the annular circumferential oil path.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 7(*a*) and (*b*) are two-view diagrams of the cotter pin 151: FIG. 7(*a*) is the frontal view, and FIG. 7(*b*) is the cross sectional view along B-B of FIG. 7(*a*) in the figure;

FIGS. 8(*a*) and (*b*) are two-view diagrams of the retainer ring: FIG. 8(*a*) is the frontal view, and FIG. 8(*b*) is the cross sectional view along B-B of FIG. 8 (*a*) in the figure;

FIGS. 9(*a*) and 9(*b*) are two-view diagrams of the C clip: FIG. 9(*a*) is the frontal view, and FIG. 9(*b*) is the cross sectional view along B-B of FIG. 9(*a*) in the figure;

DETAILED DESCRIPTION OF THE PREFERRED EMBODIMENTS

Figure 1:
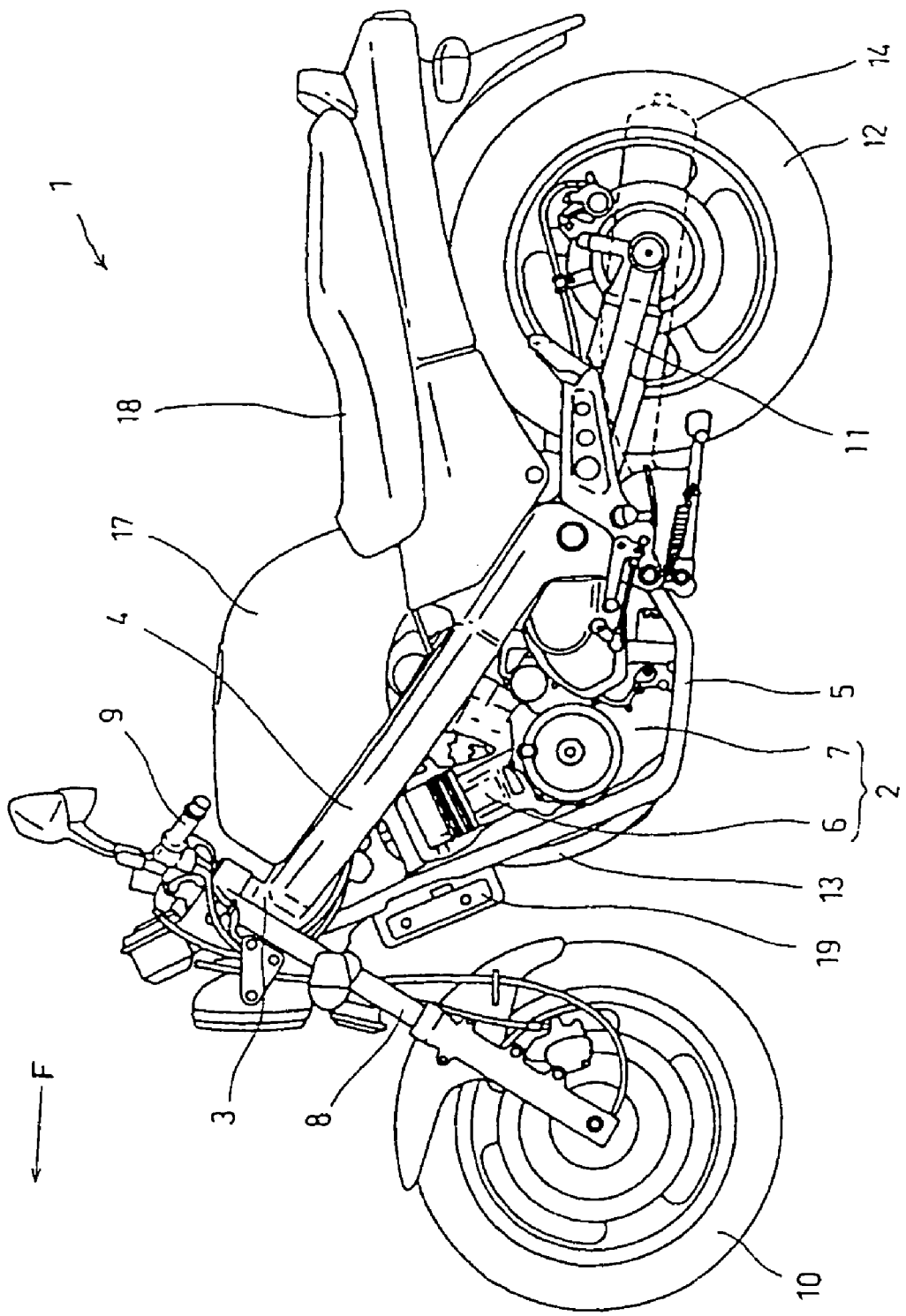
FIG. 1 is a side view of the motorcycle 1 including the power unit 2 of the embodiment of this invention.

FIG. 1 is a side view of the motorcycle 1 containing the power unit 2 of the embodiment of this invention. A pair of main frames 4 connecting to the head pipe 3 and sloping downwards to the rear, and a pair of sub frames 5 sloping downwards from the lower section of the head pipe 3, bending rearwards, and whose tip connects to the rear end of the main frame 4 are formed on this motorcycle 1.

A power unit 2 integrating an internal combustion engine 6 and a transmission 7, is mounted in the largely triangular space formed by the main frame 4 and the sub frame 5 as seen from the side. A front fork 8 is supported to allow rotation in the head pipe 3. The steering handle 9 is mounted on the top end of this front fork 8, and a front wheel 10 is axially supported by the bottom end. A pair of rear forks 11 are supported on their forward end by the rear section of the main frame 4 and are capable of swinging upward and downward. A rear suspension (not shown in drawing) is mounted between the rear end of the main frame 4 and the center section of the rear fork 11. A rear wheel 12 is axially supported on the rear end of the rear forks 11.

The internal combustion engine 6 is a water cooled, V-type two-cylinder combustion engine with the cylinders opening in a V shape towards the front and rear. The crankshaft of the internal combustion engine 6 is perpendicular to the forward direction of the vehicle, and installed facing towards the left and right of the vehicle. The transmission shaft of the transmission 7 is parallel to the crankshaft. The rear wheel drive shaft (not shown in drawing) is connected to the connecting shaft 85 (FIG. 2) perpendicular to the output shaft of the transmission, and extends to the rearward of the vehicle, reaching the rotating shaft of the rear wheel 12 and driving the rear wheel 12.

An exhaust pipe 13 connecting to the exhaust port installed facing the front and rear of the two vehicle cylinders, extends forwards of the internal combustion engine 6, and extends under the transmission 7 extending to the frame rear section, connecting to the exhaust muffler 14. A fuel tank 17 is mounted on the upper section of the (main) frame 4, and a seat 18 is mounted to the rear. This internal combustion engine 6 is the water-cooled type, and cooling water whose temperature rises during the process of cooling the cylinder and oil is cooled in the radiator 19 installed on the front end of the sub frame 5.

Figure 2:
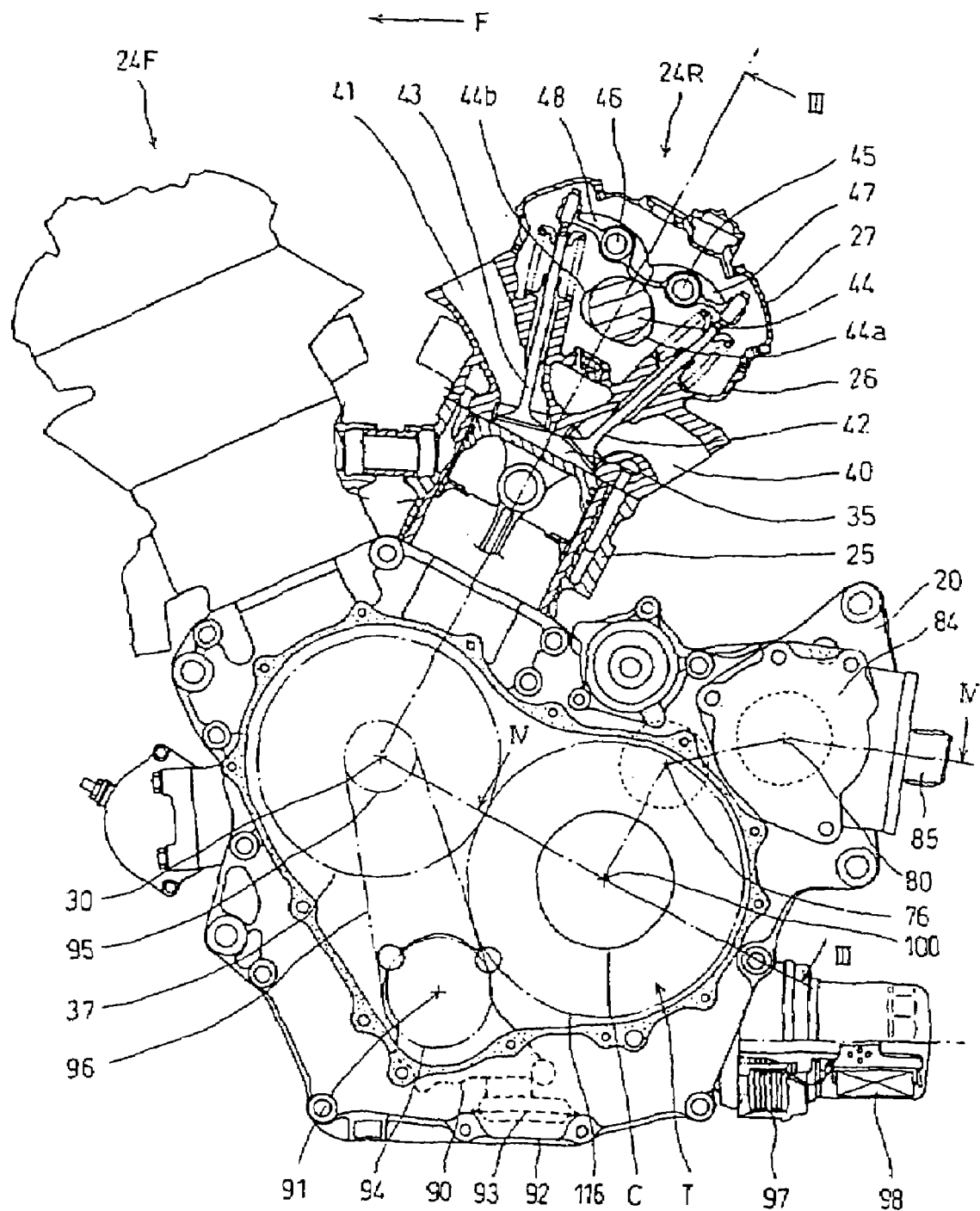
FIG. 2 is a left side view of the power unit 2 mounted in the motorcycle.

FIG. 2 is a left-side view of the power unit 2 mounted on the motorcycle. The arrow F indicates the front during installation in the frame. The front side cylinder 24F and the rear side cylinder 24R possess the same internal structure so the cross section of only the rear side cylinder 24R is shown. The crankcase rear section shows the state with the left crankcase cover removed and shows the positions of the main internal rotating shafts and gears and sprockets.

Figure 3:
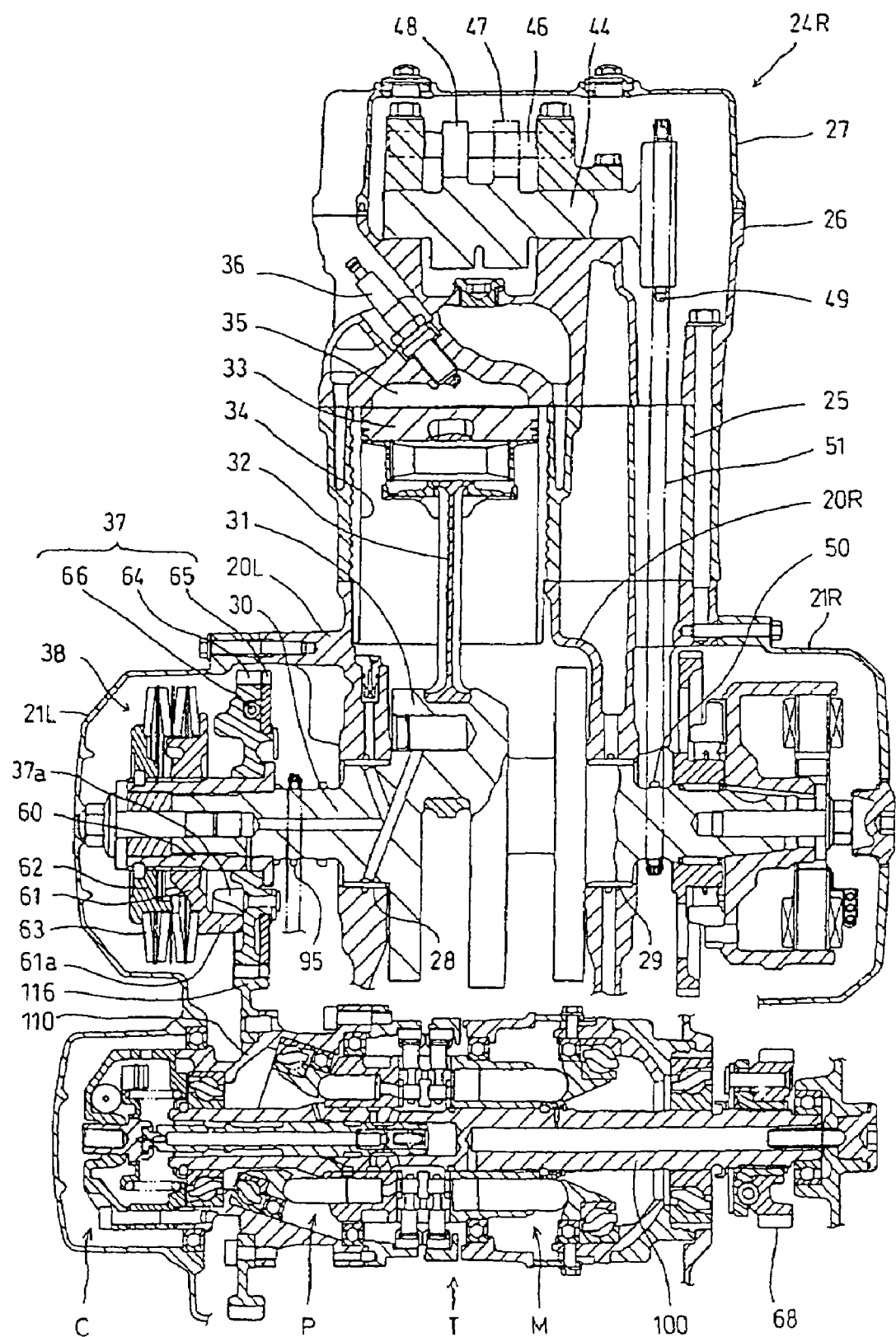
FIG. 3 is a cross sectional cutaway view along lines III-III of FIG. 2.

FIG. 3 is a cross sectional view taken along lines III-III of FIG. 2. This figure is a cross sectional view including the rear side cylinder 24R and the crank shaft 30 and the transmission shaft 100 of the static hydraulic continuously variable transmission T. The rear side cylinder 24R is a cylinder holding the piston 33 connecting to the left side crankpin 31.

The main components of the power unit 20 in FIG. 2 and FIG. 3 are the crankcase 20 comprised of a left crankcase 20L and a right crankcase 20R, a left crankcase cover 21L, a right crankcase cover 21R, and a cylinder block 25, a cylinder head 26 and a cylinder head cover 27 respectively installed with the front side cylinder 24F and the rear side cylinder 24R. The following description of the cylinder sections is based on the rear cylinder 24R.

In FIG. 3, the crankshaft 30 is supported to allow free rotation by the left side bearing 28 and the right side bearing 29 held in the left/right crankcases 20L and 20R. A connecting rod 32 and a piston 33 are connected to the left side crankpin 31 on the crankshaft 30, and the piston 33 is held to allow sliding movement in the cylinder hole 34 of the cylinder block 25. A combustion chamber 35 is formed in the section facing the piston 33 of the cylinder head 26. A spark plug 36 inserts through the wall of the cylinder head 26, and the spark plug tip enters the combustion chamber 35, and the spark plug rear end is exposed externally.

In FIG. 2, an exhaust port 40 and an intake port 41 are connected to the combustion chamber 35. The exhaust port 40 extends forwards in the front side cylinder 24, and rearward in the rear side cylinder 24R. The intake port 41 extends upwards for either cylinder in the space between both cylinders. The exhaust port 40 contains an exhaust valve 42, and the intake port 41 contains an intake valve 43. A camshaft 44 is installed inside the cylinder head cover 27. An exhaust rocker arm shaft 45, and an intake rocker arm shaft 46 are installed above the camshaft 44. The exhaust rocker arm 47 and the intake rocker arm 46 installed on these arm shafts are driven by the cam 44*a*, 44*b* of the camshaft 44, and press the stem top section of the intake valve 43 and the exhaust valve 42 to drive the each valve to open or close. In FIG. 3, the camshaft 44 is driven by a camshaft drive chain 51 hooked on the camshaft drive sprocket 50 installed in the crankshaft 30 and the camshaft auxiliary sprocket 49 installed on the end (of camshaft 44.

In FIG. 2, a low-pressure oil pump and a high-pressure oil pump are integrated via an oil pump shaft 91 into an oil pump cluster 90, at a lower section of the crankcase 20. The low-pressure oil pump feeds oil towards the internal combustion engine 6, and the high-pressure oil pump feeds oil towards the static hydraulic continuously variable transmission T. The oil pump cluster suctions oil within the oil pan 92 way of the lower section oil strainer 92.

The internal combustion engine 6 drives the oil pump cluster 90 via an oil pump drive chain 96 engaged on the oil pump shaft drive sprocket 95 installed in the crankshaft 30, and the oil pump auxiliary drive sprocket 94 inserted into the oil pump shaft 91. An oil cooler 97 and a low-pressure oil filter 98 can be seen on the rear section of the crankcase. The high-pressure oil filter is installed on the right side of the crankcase and is therefore not shown in the drawing.

In FIG. 3, the crankshaft output gear 37 installed on the left end of the crankshaft 30, functions as a gear in combination with the cam type torque damper 38, and engages with the transmission input gear 116 installed on the casing 110 of the tilt plate plunger-type hydraulic pump P of the static hydraulic continuously variable transmission T. The crankshaft output gear 37 and the cam type torque damper 38 are installed on a collar 60 spline-coupled to the crankshaft 30. The crankshaft output gear 37 mounted for free rotation on the collar 60, and a recessed cam 37a with a concave surface in an arc-shape is formed on that side surface. A lifter 61 is inserted on the outer circumferential spline of the collar 60 to allow axial movement. A protruding cam 61a with an arc-shaped protruding surface is formed on the edge of the same lifter 61, and this same protruding cam 61a engages with the recessed cam 37a. A spring holder 62 is fastened to the edge of the collar 60 with a spline and cotter pin. A flat spring 63 is installed between this same spring holder 62 and the lifter 61, and forces the protruding cam 61a towards the recessed cam 37a.

During operation at fixed speed, the crank shaft 30 torque is transferred in sequence to the collar 60, the lifter 61, the protruding cam 61a, the recessed cam 37a, and the crankshaft output gear 37, and the crankshaft output gear 37 rotates along with the crankshaft 30. When excessive torque is applied to the crankshaft 30, the protruding cam 61a slides along the circumference of the cam surface of the recessed cam 37a, and moves axially opposing the force of the flat spring 63, absorbing the huge torque and alleviating the impact.

The crankshaft output gear 37 is a gear for reducing backlash. The crankshaft output gear 37 is comprised of a thick, main gear 64 in the center, and a thin auxiliary gear 65 supported to allow concentric rotation versus the main gear 64, and an auxiliary gear coil spring 66 for applying a peripheral force via the auxiliary gear 65 on the main gear 64. The auxiliary gear applies a circumferential (peripheral) force to eliminate the backlash gap that occurs between the main gear and the normal gear, when the backlash reducing gear engages with a normal gear and so can eliminate looseness (play) and alleviate noise to quiet the mechanism. In the present case, the noise from the crankshaft output gear 37 engaging with the transmission input gear 116 is reduced.

In FIG. 3, the static hydraulic continuously variable transmission T is installed rearward of the crankshaft 30. The static hydraulic continuously variable transmission T is a device combining a centrifugal governor clutch C, tilt plate plunger-type hydraulic pump P, and tilt plate hydraulic motor M via the motor transmission shaft 100. When the rotation speed of the casing 110 of the tilt plate plunger-type hydraulic pump P exceeds the specified speed, the transmission input gear 116 connects (engages) the static hydraulic continuously variable transmission T due to the centrifugal force effect of the governor clutch C to change the speed. The static hydraulic continuously variable transmission T changes the speed by changing the speed (gear) ratio according to the tilted state of the tilt plate for the tilt plate hydraulic motor M. The rotational force for the change in speed is extracted from the motor transmission shaft 100 that rotates as one piece with the hydraulic pump P and the hydraulic motor M. A motor servomechanism changes the tilt angle of the tilt plate of the tilt plate hydraulic motor M. The structure and effect of the static hydraulic continuously variable transmission T is described later on.

Figure 4:
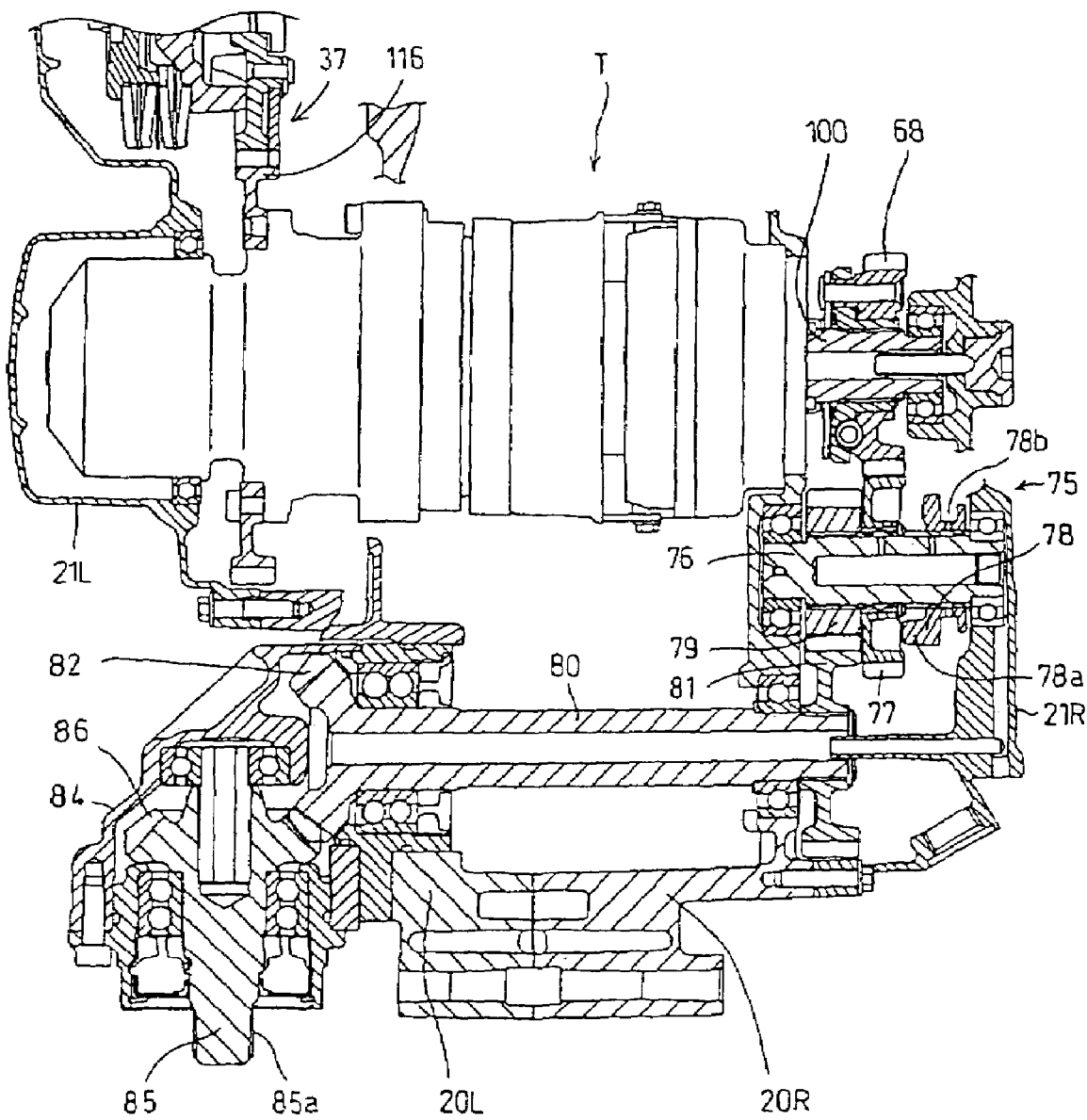
FIG. 4 is a cross sectional view along IV-IV of FIG. 2.

FIG. 4 is a cross sectional view taken along lines IV-IV in FIG. 2. This is the path for transmitting power from the transmission shaft 100 to the connecting shaft 85. A neutral-drive selector shaft 76 for the neutral-drive selector clutch 75 for selecting the neutral and drive states, and in parallel with the transmission shaft 100, is supported via ball bearings in the right crankcase 20R and the left crankcase 20L to allow rotation. An output shaft 80 in parallel with the neutral-drive selector shaft 76, is supported via ball bearings in the right crankcase 20R and the right crankcase cover 21R to allow rotation. Further, the connecting shaft 85 perpendicular to the output shaft 80, is supported by the connecting shaft support section 84 installed near the left edge of the output shaft 80 to allow rotation. The connecting shaft support section 84 is installed on the outer side of the left crankcase 20L (Also see FIG. 2.).

In FIG. 4, a gear 68 is clamped to the transmission shaft 100. A gear 77 is inserted into the neutral-drive selector shaft 76 to allow rotation versus the shaft. The gear 77 engages with the transmission output gear 65 affixed to the transmission 100. The swing member 78 including a mesh gear 78a and adjacently connected to the gear 77, is inserted to allow sliding axially to the neutral-drive selector shaft 76. The neutral-drive selector clutch 75 includes the neutral-drive selector shaft 76, the gear 77, and a swing member 78; and cuts off or connects the drive power conveyed from the transmission drive shaft 100 to the output shaft 80. When the mesh gear 78a of swing member 78 releases from the gear 77, the neutral-drive selector clutch 75 sets a neutral state, and slides the swing member 78, and when the mesh gear 78a engages with the mesh section of the gear 77, the drive power transmission path is connected, and the drive state is set.

In FIG. 4, a gear 79 is inserted on the neutral-drive selector shaft 76 and adjacently contacts the gear 77 on the opposite side of the slide member 78. A gear 81 is inserted on the right end of the output shaft 80 to engage with the gear 79 of neutral-drive selector shaft 76. A bevel gear 82 is formed as one piece with the other end of the output shaft 80. A bevel gear 86 is formed as one piece on the front end of the connecting shaft 85, and engages with the bevel gear 82 of the output shaft 80. A spline 85a is mounted on the rear end of the connecting shaft 85 for connection to the rear wheel drive shaft. The rotational output power of the static hydraulic continuously variable transmission T is transmitted to the rear wheel transmission shaft by way of these shafts and gears.

Figure 5:
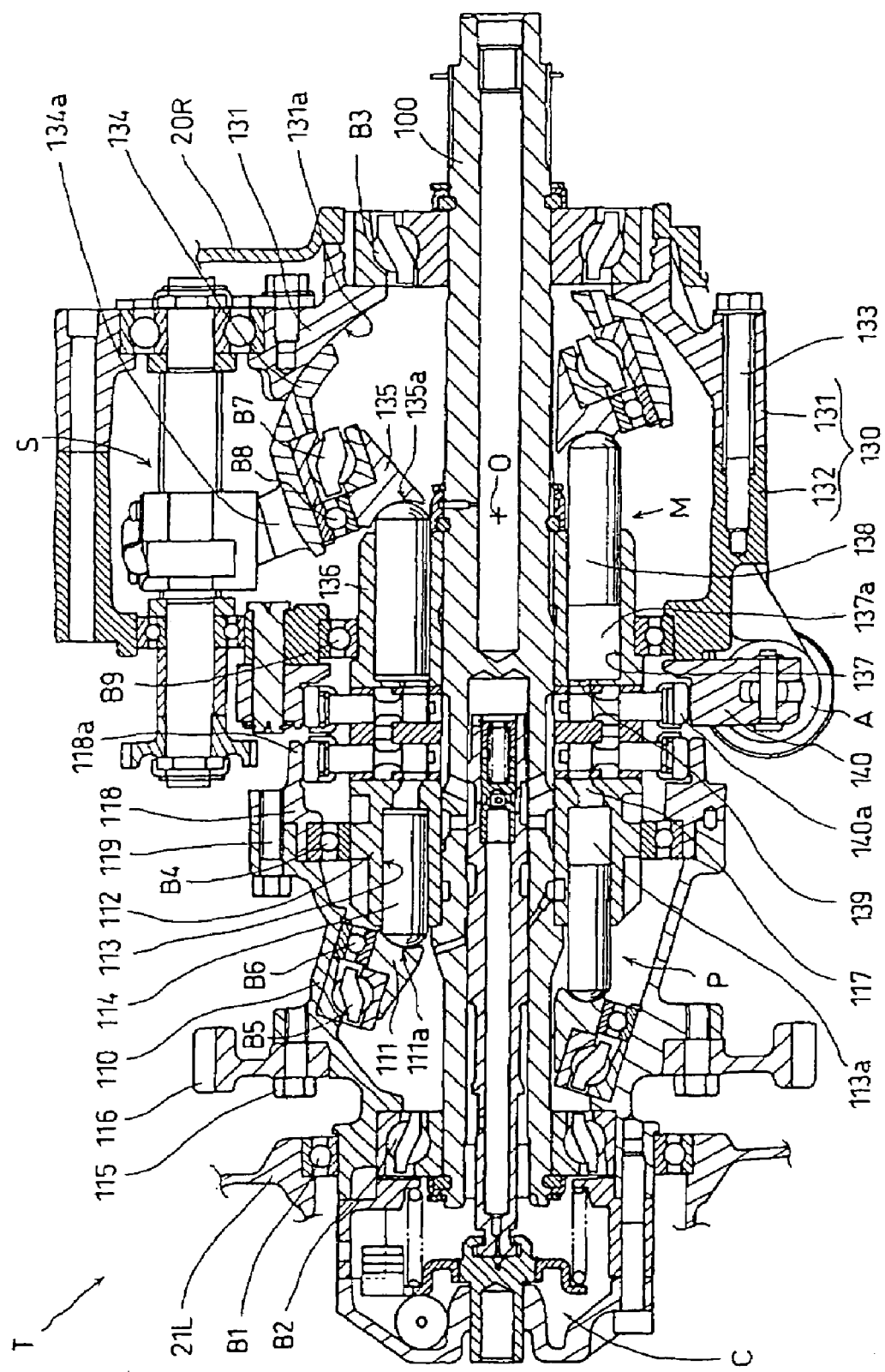
FIG. 5 is a vertical cross sectional view of the static hydraulic continuously variable transmission T.

FIG. 5 is a vertical cross sectional view of the static hydraulic continuously variable transmission T. The static hydraulic continuously variable transmission T is made up of a tilt plate plunger-type hydraulic pump P, a tilt plate plunger-type hydraulic motor M, and a centrifugal governor clutch C. The transmission shaft 100, functioning as the output shaft for the static hydraulic continuously variable transmission T, is mounted to pass through the center (of transmission T). The left end of the transmission shaft 100 is supported to allow rotation by the ball bearings B1, B2 on the left crankcase cover 21L, and the right end is supported to allow rotation by the ball bearing B3 on the right crankcase 20R.

The hydraulic pump P includes a pump casing 110 capable of rotating relative to the transmission shaft 100 and installed concentrically with it; a pump tilt plate 111 installed tilted at a specific angle versus the rotating shaft of the pump casing in the interior of the pump casing 110, and a pump cylinder 112 installed facing this same pump tilt plate 111; and multiple pump plungers 114 installed to slide within the pump plunger holes 113 arrayed in a ring shape enclosing the shaft center within the pump cylinder 112. One end of the pump casing 110 is supported to allow rotation by the bearing B2 in the transmission shaft 100, and the other end is supported to allow rotation by the bearing B4 in the pump cylinder 112, and also supported to allow rotation by the bearing B1 in the left crankcase cover 21L. The pump tilt plate 111 is installed tilted at a specified angle to allow rotation relative to the pump casing 110 by the bearings B5, B6.

The transmission input gear 116 affixed by the bolt 115 is installed on the outer circumference of the pump casing. The outer end of the pump plunger 114 engages with the tilt plate surface 111a of the pump tilt plate 111 protruding outwards, and the inner edge of the pump plunger 114 forms a pump fluid chamber 113a in the pump plunger hole 113. A pump passage opening 117 functioning as a dispensing hole and an intake hole is formed on the edge of the pump plunger hole 113. The pump casing 110 rotates when the transmission input gear 116 is made to rotate, and the pump tilt plate 111 installed inside slides along with the rotation of the pump casing 110, and the pump plunger 114 moves back and forth within the pump plunger hole 113 according to the swing of the tilt plate surface 111a, and the hydraulic fluid within the pump fluid chamber 113a is dispensed and suctioned.

The pump eccentric ring member 118 is installed by a bolt 119 on the right edge of the pump casing 110 in the center of the drawing. The inner circumferential surface 118a of the pump eccentric ring member 118 is formed in a tubular shape that is off-center versus the rotating shaft of pump casing 110. Therefore, this inner circumferential surface 118a is also a tubular shape offset in the same way versus the center line of the transmission shaft 100 and the pump cylinder 112.

The casing 130 of the hydraulic motor M is affixed and supported while clamped to the right crankcase 20R. The motor casing 130 is formed from the spherical member 131 and the elongated member 132, and is clamped by the bolt 133. A support spherical surface 131a is formed on the inner surface of the spherical member 131. The hydraulic motor M is comprised of a motor casing 130, and a motor swing member 134 slide connected and supported on the support spherical surface 131a, and a motor tilt plate 135 supported to allow rotation by the bearings B7, B8 within the motor swing member 134, and a motor cylinder 136 facing the motor tilt plate 135, and a motor plunger 138 installed to allow sliding within the multiple plunger holes 137 passing through in the axial direction and arrayed in a ring shape enclosed the center axis of the motor cylinder 136. The motor cylinder is supported for rotation along that external circumference in the elongated member 132 of motor casing 130 by way of the bearing B9. The motor swing member 134 is capable of swinging in a movement centering on the center O extending at a right angle (direction perpendicular to the paper surface) to the center line of the transmission shaft 100.

The outer side edge of the motor plunger 138 engages with the tilt plate surface 135a of the motor tilt plate 135 protruding outwards, and the inner side edge of the motor plunger 138 forms a motor fluid chamber 137a within the motor plunger hole 137. A motor passage opening 139 functioning as an intake port and a dispensing (exhaust) port for the motor is formed in the edge of the motor plunger hole 137. The edge of the motor swing member 134 is formed as an arm 134a protruding to the outer side and protrudes outwards towards the radius to connect to the motor servo mechanism S. The arm 134a is controlled by the motor servo mechanism S to move left and right, and is controlled to swing centering on the swing center O of the motor swing member 134. When the motor swing member 134 swings, the motor tilt plate 135 supported in internally inside it (134) also swings, and changes the angle of the tilt plate.

Figure 6:
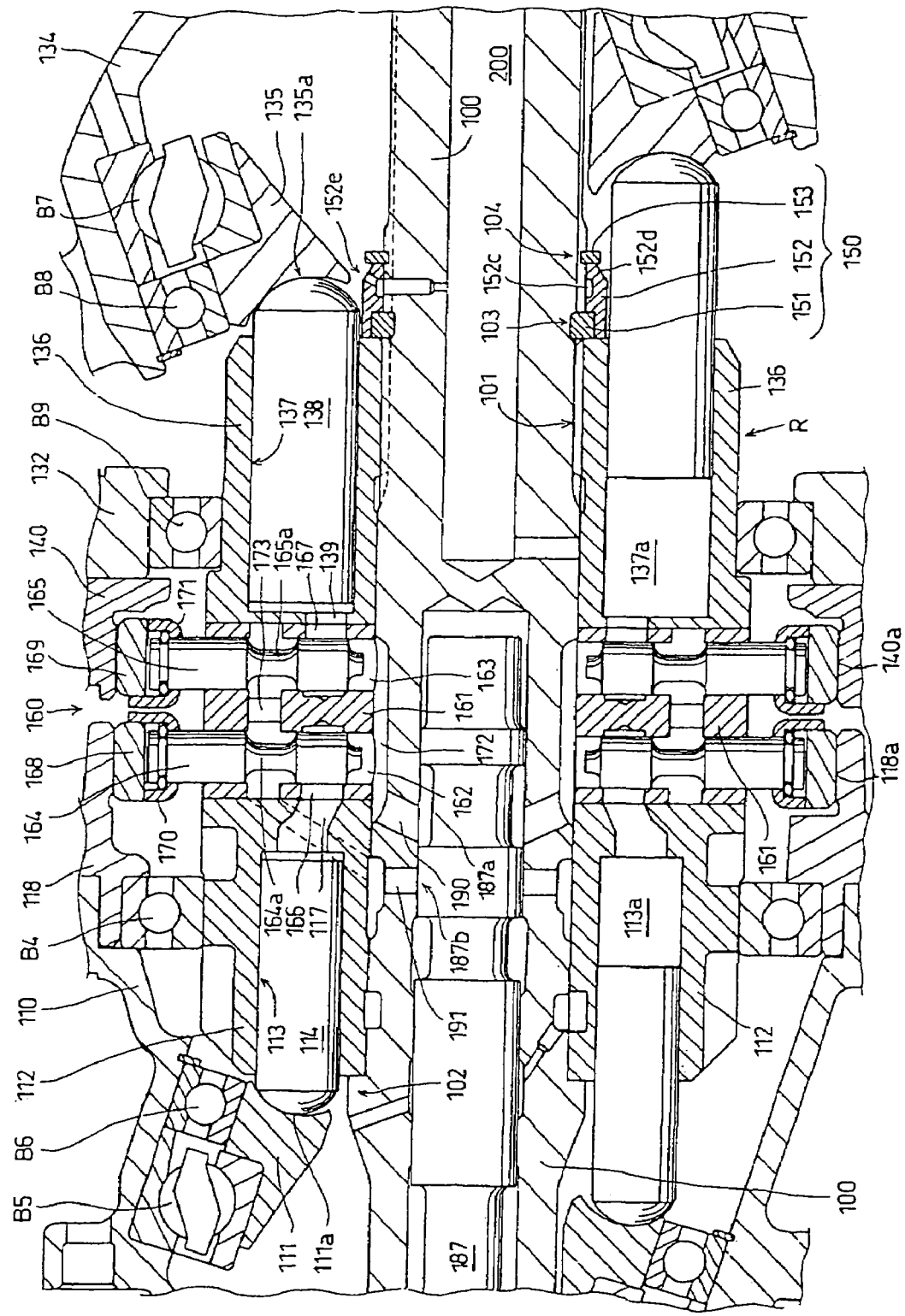
FIG. 6 is a cross sectional view of an essential section of the static hydraulic continuously variable transmission T showing the vicinity of the distributor valve 160.

FIG. 6 is an enlarged cross sectional view of the vicinity of the distributor valve 160 of the static hydraulic continuously variable transmission T. The distributor valve 160 is installed between the pump cylinder 112 and the motor cylinder 136. The valve body 161 of the distributor valve 160 is supported between the pump cylinder 112 and the motor cylinder 136, and is integrated with these cylinders by brazing. The motor cylinder 136 is coupled to the transmission shaft 100 by a spline 101. The pump cylinder 112, the distributor valve 160, and the motor cylinder 136 rotate with the transmission shaft 100 as one unit. This integrated pump cylinder 112, valve body 161 of the distributor valve 160, and the motor cylinder 136 are called the output rotation piece R. The structure for attaching the output rotation piece R to the transmission shaft is described. A large diameter section 102 that is short along the axial length is formed on the outer circumferential side of the transmission shaft 100 corresponding to the left edge position of the pump cylinder. The left edge surface of the pump cylinder 112 contacts the edge surface of this large diameter section 102, to perform positioning to the left.

The right side positioning of the output rotation piece R is performed by the stop member 150 installed on the transmission shaft 100 facing the motor cylinder 136. The stop member 150 includes a cotter pin 151, a retainer ring 152, and a C ring 153. To install the stop member 150, a ring-shaped first stop groove 103, and second stop groove 104 are formed across the outer circumference of the spline 101. A pair of cotter pins 151 is separately formed in a semicircular shape shown in FIG. 7 and is installed in the first stop groove 103. A retainer ring 152 is installed above it as shown in FIG. 8. The tip section 152a of the retainer ring 152 covers the outer circumferential surface of the cotter pin 151, and the inward facing flange 152b of retainer ring 152 contacts the side surface of the cotter pin. Moreover, the C ring 153 is installed as shown in FIG. 9 in the second stop groove 104, and prevents the retainer ring 152 from coming loose. As a result of the above, the right edge surface of the motor cylinder 136 directly contacts the stop piece 150 and is positioned towards the right.

The output rotation piece R is in this way positioned to the left by the large diameter piece 102 via the spline 101; and positioned to the right versus the transmission shaft 100 by the stop piece 150 and rotates along with the transmission shaft 100 as one piece. A lubricating oil injection nozzle 152e connecting the outer tilt plate 152d and the inner circumferential ring groove 152c of the retainer ring 152 is drilled as three sections along the entire circumference.

In FIG. 6, the multiple pump side valve holes 162 and motor side valve holes 163 extending towards the diameter and positioned at equal spaces along the periphery within the valve body 161 forming the distributor valve 160, are formed in an array of two rows. A pump side switcher valve 164 is installed within the pump side valve hole 162, and a motor side switcher valve 165 is installed within the motor side valve hole 163 and each (164, 165) is capable of sliding movement.

The multiple pump side valve holes 162 are formed to correspond to the pump plunger holes 113. Each of the pump side valve holes 162, and pump flow passages 117 formed in the inner side edge of the pump plunger holes 113, and the multiple pump side connecting passages 166 formed to respectively connect to them (162, 117), are formed in the valve body 161. The motor side valve holes 163 are formed to correspond to the motor plunger holes 137. The motor connecting passages 139 formed on the inner edge side of the motor plunger holes 137, and the motor connecting passages 167 connecting with the respective motor side valve holes 163, are formed in the valve body 161.

A pump side cam ring 168 is installed at a position enclosing the outer circumferential edge of the pump side switcher valve 164 on the distributor valve 160. A motor side cam ring 169 is installed at a position enclosing the outer circumferential edge of the motor side switcher valve 165 on the distributor valve 160. The pump side cam ring 168 is installed onto the inner circumferential surface 118a of pump eccentric ring member 118 clamped by a bolt 119 to the tip of the pump casing 110 (FIG. 5). The motor cam ring 169 is installed onto the inner circumferential surface 140a of the motor eccentric ring member 140 positioned in contact with the tip of the elongated member 132 of motor casing 130 (FIG. 5). The outer side edge of the pump side switcher valve 164 on the inner circumferential surface of the pump side cam ring 168 is engaged to allow sliding movement via the pump side restrictor ring 170. The outer side edge of the motor side switcher valve 165 on the inner circumferential surface of the motor side cam ring 169 is engaged to allow sliding movement via the motor side restrictor ring 171. The cam ring and the restrictor ring are both capable of relative rotation on either the pump side or the motor side.

A ring-shaped recess functioning as the inner side passage 172 is carved onto the outer circumferential surface of the transmission shaft 100 facing the inner circumferential surface of the valve body 161. The inner edge of the motor side valve hole 163 and the pump side valve hole 162 are connected to this inner side passage 172. An outer side passage 173 is formed near the external circumference of the valve body 161 to connect with the pump side valve hole 162 and motor side valve hole 163.

The operation of the distributor valve 160 is described here. When the drive force of the internal combustion engine is conveyed to the transmission input gear 116 and the pump casing 110 rotates, and the pump tilt plate 111 swings according to that rotation. The pump plunger 114 engaging with the tilt plate surface 111a of the pump tilt plate 111 moves axially back and forth within the pump plunger hole 113 by way of the swinging of the pump tilt plate 111. Hydraulic fluid is dispensed via the pump passage opening 117 from the pump fluid chamber 113a during inward movement of the pump plunger 113, and hydraulic fluid is suctioned into the pump fluid chamber 113a via the pump passage opening 117 during outward movement.

At this time, the pump side cam ring 168 installed on the inner circumferential surface 118 of the pump eccentric ring member 118 coupled to the edge of the pump casing 110, rotates along with the pump casing 110. The pump side cam ring 168 is offset (eccentric) versus the rotation center of the pump casing 110. In other words, it is installed offset (eccentric) to the valve body so that the pump side switcher valve 164 moves back and forth along the diameter within the pump side valve hole 112, according to the rotations of the pump side cam ring 168.

The pump side switcher valve 164 moves back and forth in this way, and when moving inwards along the diameter within the valve body 161, the pump side connecting passage 166 opens outwards along the diameter via a small diameter section 164a of the pump side switcher valve 164, and connects the pump passage opening 117 and the outer side passage 173. When the pump side switcher valve 164 moves outward along the diameter within the valve body 161, the pump side connecting passage 166 opens inwards along the diameter, and connects the pump passage opening 117 and the inner side passage 172.

The pump tilt plate 111 swings along with the rotation of the pump casing 110, the pump side cam ring 168 moves the pump side switcher valve 164 back and forth along the diameter, to match the position (lower dead point) where the pump plunger 114 is pressed farthest to the outside, and the position (upper dead point) where furthermost to the inside during its back and forth movement. The pump plunger 114 consequently moves from the lower dead point to the upper dead point along with the rotation of the pump casing 110, and the hydraulic fluid within the pump fluid chamber 113a is dispensed from the pump passage opening 117. The pump passage opening 117 at this time is connected to the outer side passage 173 so that the hydraulic fluid is sent to the outer side passage 173. On the other hand, when the pump plunger 114 moves from the upper dead point to the lower dead point along with the rotation of the pump casing 110, the hydraulic fluid within the inner side passage 172 is suctioned inside the pump fluid chamber 113a via the pump passage opening 117. In other words, when the pump casing 110 is driven, hydraulic fluid is dispensed from a pump fluid chamber 113a on one side and supplied to the outer side passage 173, and hydraulic fluid is suctioned from the inner side passage 172 into the pump fluid chamber 113a on the other side of the transmission shaft 100.

However, the motor side cam ring 169 installed on the inner circumferential surface 140a of the motor ring eccentric member 140, positioned in sliding contact on the edge of the motor casing 130, is positioned eccentrically versus the rotation center of the transmission shaft 100 and the output rotation piece R, and motor cylinder 136, when the motor ring eccentric member 140 is in the usual position, When the motor cylinder 136 rotates, the motor side switcher valve 165 moves back and forth along the diameter within the motor side valve hole 163 according to that (136) rotation.

When the motor side switching valve 165 moves inwards along the diameter within the valve body 161, the small diameter section 165a of the motor side switching valve 165 opens the motor side connection path 167 to the outside, connecting the motor passage opening 139 and the outer side passage 173. When the motor side switching valve 165 moves outward along the diameter within the valve body 161, the motor side connection path 167 opens inwards along the diameter, connecting the motor passage opening 139 and the inner side passage 172.

The hydraulic fluid dispensed from the hydraulic pump P is sent to the outer side passage 173, and this hydraulic fluid is supplied via the motor side connection path 167, and the motor passage opening 139 to inside the motor fluid chamber 137a, and the motor plunger 138 is pressed axially outward. The outer edge of the motor plunger 138 is configured to slide-contact to the section where the motor tilt plate 135 moves from the upper dead point to the lower dead point; and due to this force pressing axially outwards, the motor plunger 138 moves along with the motor tilt plate 135, along the tilted surface formed by the motor sliding member 134 and the bearing B7, B8. The motor cylinder 136 is consequently pressed by the plunger 138 and driven. Along with the rotation of the motor cylinder 136, the motor side cam ring 169 makes the motor side switching valve 165 move back and forth along the diameter in the valve body 161, corresponding to the back and forth movement of the motor plunger 138.

The motor cylinder 136 on the opposite side, moves the periphery of the transmission shaft 100 along with the rotation of the motor tilt plate 135 centering on the transmission shaft 100, moving from the lower dead point to the upper dead point, and the hydraulic fluid within the motor fluid chamber 137a is sent from the motor passage opening 139 to the inner side passage 172, and is suctioned via the pump side connecting passages 166 and pump passage opening 117.

A hydraulic shut off circuit joining the tilt plate hydraulic motor M and the tilt plate plunger-type hydraulic pump P is in this way formed by the distributor valve 160. The hydraulic fluid dispensed according to the rotations of the hydraulic pump P is sent to the hydraulic motor M via the other hydraulic shut-off circuit (outer side passage 173), driving it. Moreover, the hydraulic fluid dispensed along with the rotation of the hydraulic motor M is returned to the hydraulic pump P via the other hydraulic shut-off circuit (inner side passage 172).

In the static hydraulic continuously variable transmission T described above, the hydraulic pump P is driven by the internal combustion engine 6, the rotation drive power of the hydraulic motor M is converted by the distributor valve 160 and the hydraulic motor M, extracted from the transmission shaft 100, and transmitted to the vehicle wheels. When the vehicle is being driven, the outer side passage 173 is the high pressure side fluid path, and the inner side passage 172 is the low pressure side. On the other hand, during times such as driving downhill, the drive force for the vehicle wheels is transmitted from the transmission shaft 100 to the hydraulic motor M, and the rotational drive force of the hydraulic motor P renders the effect of an engine brake conveyed to the internal combustion engine 6, the inner side passage 172 is the high pressure side fluid path, and the outer side passage 173 is the low pressure side fluid path.

The gear ratio of the static hydraulic continuously variable transmission T can be continuously changed by varying the tilt angle of the motor swing member 134. The tilt angle of the motor swing member 134 is changed for a motor tilt plate angle of zero or in other words, when the motor tilt plate is perpendicular to the transmission shaft, the top gear ratio is reached, the amount of offset (eccentricity) of the eccentric (ring) member 140 reaches zero due to the effect of the lockup actuator A (FIG. 5), the center of the motor cylinder 136 matches the center of the eccentric member 140, and the pump casing 110, the pump cylinder 112, the motor cylinder 136, and the transmission shaft 100 rotates as one unit to efficiently transfer the drive power.

Figure 10:
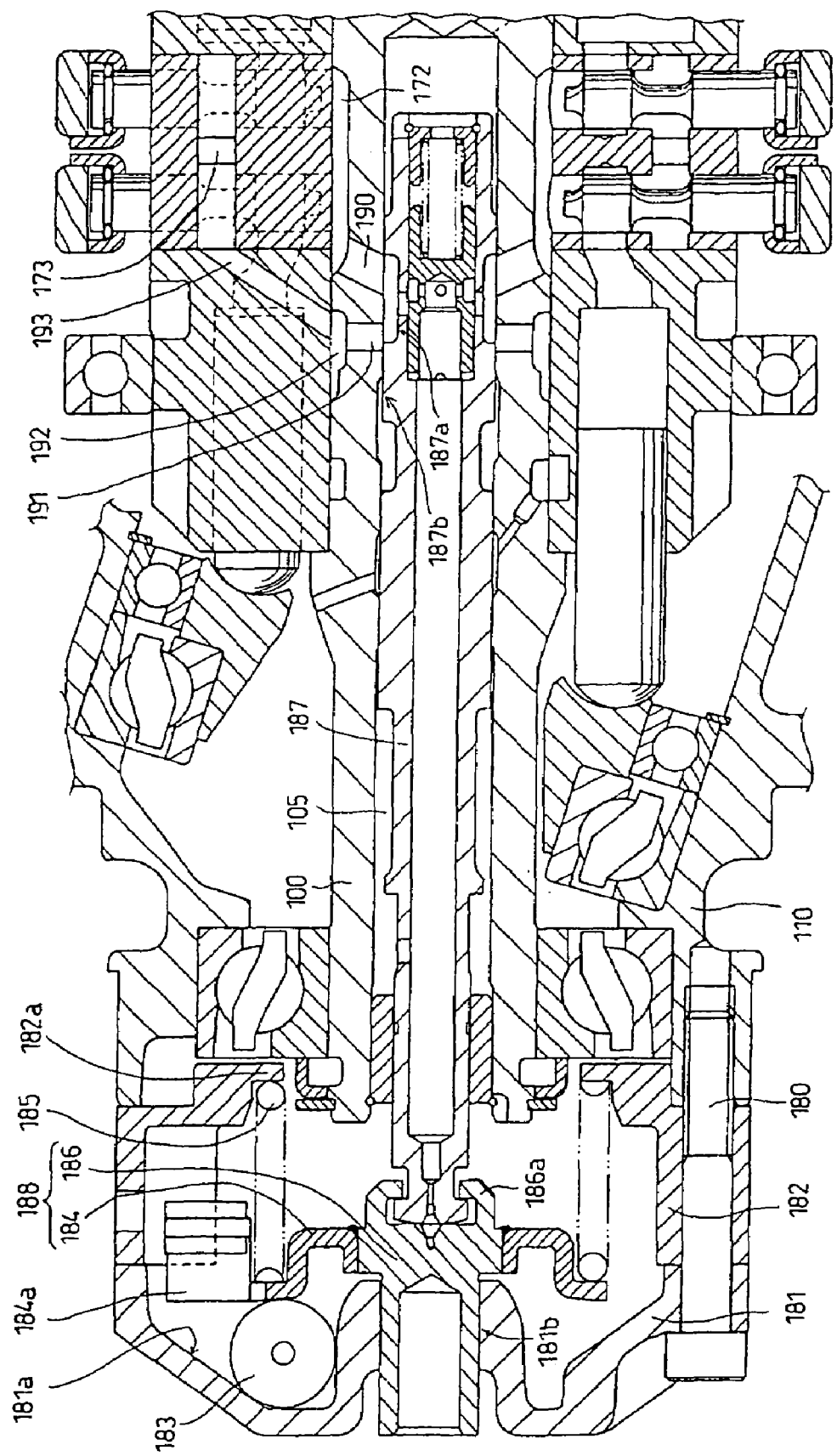
FIG. 10 is vertical cross sectional view of an essential section of the static hydraulic continuously variable transmission T showing the vicinity of the centrifugal governor clutch C.

FIG. 10 is a vertical cross sectional view of the vicinity of the centrifugal governor clutch C. When the inner side passage 172 and the outer side passage 173 are connected in the static hydraulic continuously variable transmission T, the high hydraulic pressure is no longer applied, and drive power is no longer transmitted between the hydraulic pump P and the hydraulic motor M. In other words, clutch control is implemented by controlling the degree of opening of the connection between the inner side passage 172 and the outer side passage 173.

The centrifugal governor clutch C includes a spring sheet member 182 and a cam plate member 181 clamped by a bolt 180 to the edge of the pump casing 110; and a roller 183 held respectively within the multiple cam plate grooves 181a formed extending diagonally along the diameter on the inner surface of the cam plate member 181; and a pressure plate 184 including an arm section 184a facing the cam plate groove 181a; and a coil spring 185 with one end supported by the spring sheet member 182 and the other end acting on the pressure plate 184 for making the arm section 184a of the pressure plate 184 apply a pressing force on the inside of the groove 181a; and a slide shaft 186 for sliding along the axial line of the transmission shaft and inserted into the center hole 181b of the cam plate member 181 and also passing through the center section of the pressure plate 184; and a rod-shaped clutch valve 187 engaged with the clutch valve engage section 186a of the slide shaft 186. One end of the coil spring 185 is supported by the spring sheet 182a formed on the inner-facing flange of the spring sheet member 182. The pressure plate 184 and the slide shaft 186 are both fabricated as separate pieces, and then coupled into a single piece to comprise the roller bearing member 188. The pressure plate 184 is fabricated by forming it in a press, and the slide shaft 186 fabricated by cutting with machining tools and both parts are then welded together into one piece.

When the pump casing 110 is in a static state, or in other words a state where neither the cam plate member 181 or the spring sheet member 182 are rotating, the arm section 184a presses the roller 183 into the cam plate groove 181a by the pressing force applied to the pressure plate 184 by the coil spring 185. The cam plate groove 181a is in a tilted state so that the roller 183 is pressed along the diameter of the cam plate member 181, and the pressure plate 184, and the swing axis 186 integrated with it, and the rod clutch valve 187 engaged in the swing shaft 186 are in a state shifted to the left.

When the pump casing 110 is driven by the rotation of the transmission input gear 116 (FIG. 5), and the cam plate 181 and the spring sheet member 182 rotate, the roller plate 183 is pressed back along the tilted surface of the cam plate member 181 outwards along the diameter by centrifugal force, and presses the arm section 184a to the right and the pressure plate 184 moves to the right while opposing the force of the coil spring 185. The amount of movement towards the right of the pressure plate 184 and the slide shaft 186 functioning as one piece with it are determined by the centrifugal force acting on the roller 183. In other words, it (amount of movement) is determined according to the rotational speed of the pump casing 110. When the rotational speed of the pump casing 110 increases, the rod clutch valve 187 engaged in the slide shaft 186, extends along the inner section of the transmission shaft 100, and shifts to the inner part of the clutch valve hole 105. The centrifugal governor mechanism is in this way configured to apply a centrifugal force to the roller 183 by utilizing the centrifugal force from the rotation of the pump casing.

An inner side connecting fluid path 190 is formed in the transmission shaft 100 as shown in FIG. 10 that joins the clutch valve hole 105 and the inner side passage 172. An outer side connecting fluid path 191 joining the clutch valve hole 105 and an outer side passage 173, and a ring-shaped groove 192 and a tilt fluid path 193 for a short connection are formed in the transmission shaft 100 and the pump cylinder 112. When the pump casing 110 is in a static state, the inner side connecting fluid path 190 and the outer side connecting fluid path 191 are connected by way of the small diameter section 187a of the rod-shaped clutch valve 187, and consequently the inner side passage 172 and outer side passage 173 are connected so the clutch is disengaged.

When the pump casing rotation exceeds the specified speed, and the rod-shaped clutch valve 187 shifts to the innermost section of the clutch valve hole 105 due to effect of centrifugal force from the governor mechanism, the small diameter section 187a of the rod-shaped clutch valve 187 releases (away) from the opening on the clutch valve hole 105 side of the outer side connecting fluid path 191, and the outer side connecting fluid path 191 opening is blocked by the large diameter side surface 187b of rod-shaped clutch valve 187 (See position of rod-shaped clutch valve 187 in FIG. 6.). The connection between the inner side passage 172 and outer side passage 173 is therefore blocked, an oil circulation shut-off circuit is formed from the hydraulic pump P and outer side passage 173 and hydraulic motor M and inner side passage 172, and the static hydraulic continuously variable transmission T functions. Switching from a clutch released state to a clutch engaged state is performed by the roller so that the clutch gradually becomes engaged (connected) according to this movement.

Figure 11:
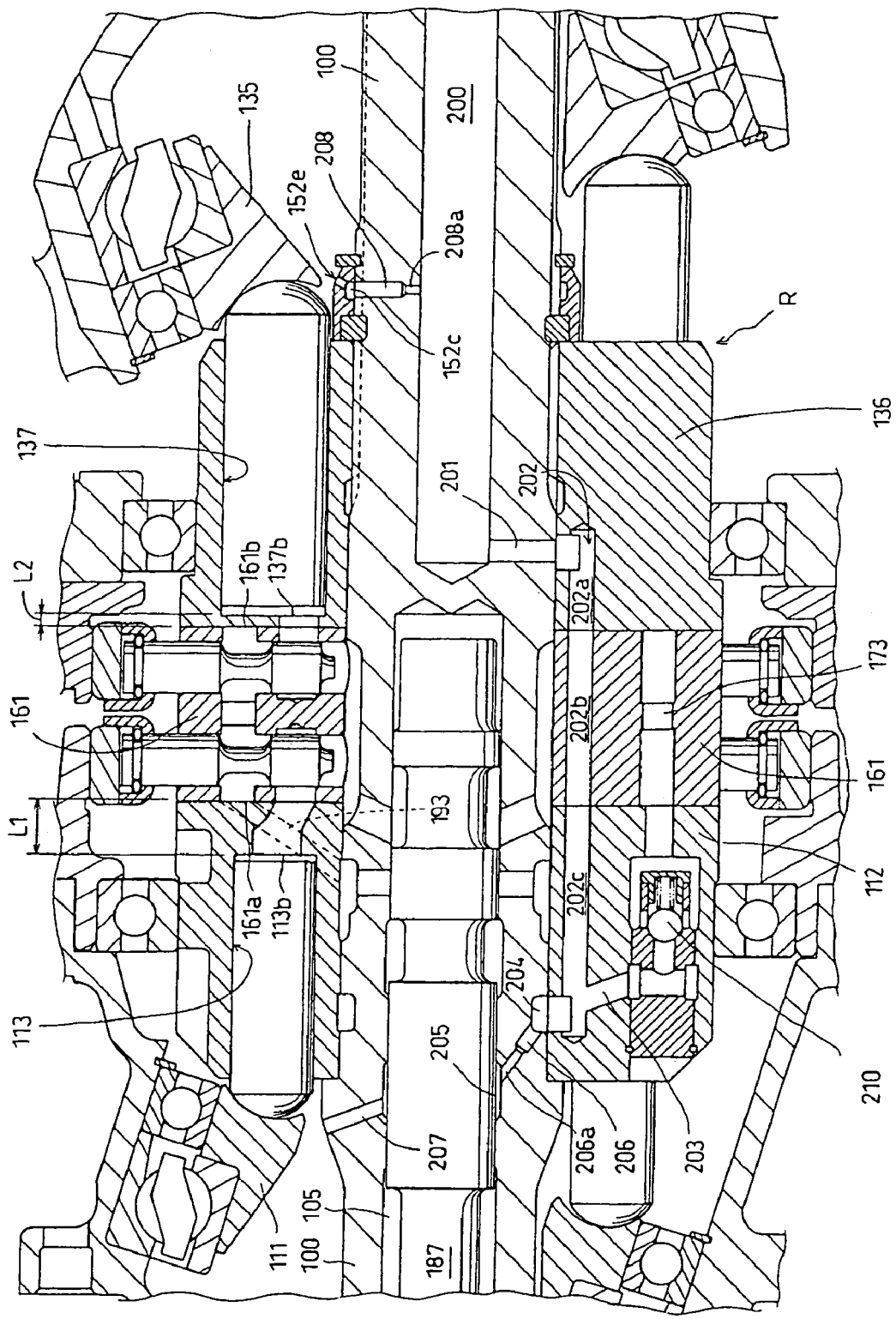
FIG. 11 is a vertical cross sectional view of an essential section of the static hydraulic continuously variable transmission T showing the supply passages for the operating fluid and the lubricant fluid.

FIG. 11 is a vertical cross sectional view of an essential section of the static hydraulic continuously variable transmission T showing the supply path for the lubricant fluid and the operating (hydraulic) fluid. The operating (hydraulic) fluid is supplied from the high-pressure oil pump of the oil pump cluster 90 driven by the internal combustion engine, via the fluid path within the crankcase, from the right end, to the transmission shaft center fluid path 200 formed along the axis and in the center of the transmission shaft 100. The innermost section of the transmission shaft center fluid path 200 is joined to the fluid path 201 extending along the diameter to the outer circumference. The fluid path 201 is also joined with the output rotation piece inner fluid path 202 formed in parallel with the transmission shaft 100 within the output rotation piece R (motor cylinder 136, valve body 161, pump cylinder 112) that rotates as one piece with the transmission shaft 100. The output rotation piece inner fluid path 202 is a fluid path including the fluid path 202a within the motor cylinder 136, the fluid path 202b within the valve body 161, and the fluid path 202c within the pump cylinder 112.

A check valve 210 for supplying replacement fluid within the outer side passage 173 is installed within the pump cylinder 112. The output rotation piece inner fluid path 202 is joined to the check valve 210 via the fluid path 203 facing outwards along the diameter in the innermost section (202), and if necessary (according to leakage of operating fluid from the hydraulic shut-off circuit), operating fluid is supplied to the outer side passage 173 of the valve body 161. A check valve and fluid path for supplying operation fluid to the inner side passage 172 are installed in the same way in another section of the pump cylinder 112, and if necessary also supply operating fluid to the inner side passage 172 (omitted from drawing).

An outer ring groove 204 is formed on the outer circumference of the transmission shaft 100 corresponding to the innermost section of the output rotation piece inner fluid path 202, and connects to the innermost section of the output rotation piece inner fluid path 202. An inner ring groove 205 is formed on the inner circumference of the clutch valve hole 105 of the transmission shaft 100, and connects to the outer ring groove 204 at one location via the connecting fluid path 206. An orifice 206a is formed in the connecting fluid path 206. On the transmission shaft 100, a lubricant oil ejection nozzle 207 connecting to the inner ring groove 205 of the clutch valve hole and facing the external circumference of the transmission shaft 100 is drilled at three locations on the transmission shaft periphery. A portion of the oil supplied within the output rotation piece inner fluid path 202 is injected by way of the lubricant oil ejection nozzle 207, and the outer ring groove 204, the connecting fluid path 206, the inner ring groove 205, and lubricates the pump tilt plate 111, etc.

A fluid path 208 is formed at one location from the transmission shaft center fluid path 200 along the diameter, facing towards the stop member 150 on the right edge positioner section of the output rotation piece R on the transmission shaft 100, and an orifice 208a is formed on its inner edge section. The outer edge section of the fluid path 208 connects along the diameter to the ring groove 152c formed on the inner circumference of the retainer 152. A portion of the oil supplied to inside the transmission shaft fluid path 200 is supplied via the fluid path 208 and the inner ring groove 152c, to the lubricant oil injection nozzle 152e formed at three locations on the periphery of the inner ring groove 152c and the outer tilt plate 152d of the retainer ring 152; and is dispensed from the lubricant oil injection nozzle 152e and lubricates the motor tilt plate 135, etc.

In FIG. 11, the distance L1 between the inner edge surface 113b of the pump plunger hole 113 and the pump side edge 161a of the valve body 161, is made large compared to the distance L2 between the inner edge surface 137b of the motor plunger hole 137 and the motor side surface 161b of the valve body 161. The larger distance is required because it is necessary to form a tilt fluid path 193 (FIG. 10) joining the clutch valve hole 105 and the outer side passage 173 between the inner edge surface 113b of the pump plunger hole 113 of pump cylinder 112 and pump side edge 161a of the valve body 161 on the pump side. Therefore the pump plunger hole 113 is separated from the valve body 161. There is no need to form a tilt fluid path on the (other) motor M side and therefore the distance between the inner edge surface 137b of the motor plunger hole 137 and the motor side surface 161b of the valve body 161 is small.

The preferred embodiments described above in detail result in the following effects.

(1) The orifice 206a punched in the communicating oil path 206 communicated with the oil feeding passage (the central oil path 200 of the transmission, the oil path 202 of the output rotary member and the outer circumferential annular groove 204 of the transmission) is used for controlling a flowing-out amount of lubricant oil and only a part of the communicating oil path 206 of relative large diameter that can be easily machined is applied as the orifice 206a of fine diameter. Therefore, it is possible to control an ejection amount of lubricant oil. Since the lubricant oil ejection hole 207 is arranged at the extreme end of the oil path, and the oil amount is controlled by the orifice 206a, a large ejection hole can be formed. This results in a certain degree of freedom in setting a hole angle, the hole orientation, and the number of holes or the like. In addition, lubricating characteristics of the slant plate, or the like, are improved. The lubricant oil is atomized into the transmission with the centrifugal force produced by a rotation of the transmission shaft 100 through the ejection hole of large diameter. Forming (by punching) an ejection hole having a relatively large diameter can be easily carried out, as compared with the conventional lubricant oil ejection hole having a fine diameter, as found in the prior art.

(2) Since there is provided one orifice 206a for adjusting a supplying amount of oil, an orifice diameter can be made large, a machining and controlling of an oil amount are improved, as compared with conventional arrangements in which the orifice is formed in a respective lubricant oil ejection hole. Since the lubricant oil ejection hole 207 can be arranged to communicate with the circumferential annular oil path (the inner circumferential annular groove 205 of the clutch valve hole), the plurality of ejection holes can be provided easily.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lubricating structure of a hydrostatic continuously variable transmission in which a hydraulic circuit comprised of a high pressure oil path for feeding working oil from a hydraulic pump to a hydraulic motor and a low pressure oil path for feeding working oil from said hydraulic motor to said hydraulic pump is constituted within a cylinder integrally formed with a transmission shaft between said hydraulic pump and said hydraulic motor within a casing rotated by a driving source, a clutch valve arranged in the transmission shaft is slid to make a shortened state between said high pressure oil path and said low pressure oil path so as to change over a transmittance of power force, the lubricating structure comprising:

an oil path arranged at an outer circumferential side of said clutch valve;

a lubricant oil ejection hole communicating with the oil path at the outer circumferential side of said clutch valve and formed in the transmission shaft toward the outer circumferential side of said transmission shaft; and a communicating oil path formed in the transmission shaft to cause an oil supplying path communicating with a lubricating oil supplying source to communicate with the oil path at the outer circumferential side of said clutch valve, wherein an orifice is arranged in said communicating oil path.

2. The lubricating structure of a hydrostatic continuously variable transmission according to claim 1, wherein the oil path at the outer circumferential side of said clutch valve has an annular shape, and wherein only a single one of the communicating oil path formed with the orifice is provided, whereas a multiples ones of said lubricant oil ejection hole are provided.

3. The lubricating structure of a hydrostatic continuously variable transmission according to claim 1, wherein the lubricant oil ejection hole lubricates a tilt plate of the hydraulic pump.

4. The lubricating structure of a hydrostatic continuously variable transmission according to claim 1, wherein the oil path at the outer circumferential side of the clutch valve is an inner ring groove of the transmission shaft.

5. The lubricating structure of a hydrostatic continuously variable transmission according to claim 1, wherein communicating oil path and the lubricant oil ejection hole are formed in the transmission shaft on opposite sides of the clutch valve.

6. The lubricating structure of a hydrostatic continuously variable transmission according to claim 1, wherein the lubricating supplying source includes a central oil path in the transmission shaft, an oil path of an output rotary member, and an outer circumferential annular groove of the transmission shaft.

7. The lubricating structure of a hydrostatic continuously variable transmission according to claim 1, wherein the communicating oil path allows the lubricating oil to flow from an outer circumferential annular groove of the transmission shaft to and inner ring of the transmission shaft, the inner ring of the transmission shaft being the oil path arranged at the outer circumferential side of the clutch valve.

8. The lubricating structure of a hydrostatic continuously variable transmission according to claim 1, wherein the orifice is formed on a downstream side of the communicating oil path.

9. The lubricating structure of a hydrostatic continuously variable transmission according to claim 1, wherein the lubricant oil ejection hole has a diameter larger than a diameter of the orifice.

10. The lubricating structure of a hydrostatic continuously variable transmission according to claim 1, wherein the communicating oil path is formed in a portion of the transmission shaft that is adjacent to a pump cylinder of the hydraulic pump.

11. A lubricating structure of a hydrostatic continuously variable transmission in which a hydraulic circuit comprised of a high pressure oil path for feeding working oil from a hydraulic pump to a hydraulic motor and a low pressure oil path for feeding working oil from said hydraulic motor to said hydraulic pump is constituted within a cylinder integrally formed with a transmission shaft between said hydraulic pump and said hydraulic motor within a casing rotated by a driving source, a clutch valve arranged in the transmission shaft is slid to make a shortened state between said high pressure oil path and said low pressure oil path so as to change over a transmittance of power force, the lubricating structure comprising:

an oil path arranged at an outer circumferential side of said clutch valve;

a lubricant oil ejection hole communicating with the oil path at the outer circumferential side of said clutch valve and formed in the transmission shaft toward the outer circumferential side of said transmission shaft; and a communicating oil path formed in the transmission shaft to cause an oil supplying path communicating with a lubricating oil supplying source to communicate with the oil path at the outer circumferential side of said clutch valve, wherein an orifice is formed in said communicating oil path, thus being disposed upstream of and separate from the lubricant oil ejection hole.

12. The lubricating structure of a hydrostatic continuously variable transmission according to claim 11, wherein the oil path at the outer circumferential side of said clutch valve has an annular shape, and wherein only a single one of the communicating oil path formed with the orifice is provided, whereas multiples ones of said lubricant oil ejection hole are provided.

13. The lubricating structure of a hydrostatic continuously variable transmission according to claim 11, wherein the lubricant oil ejection hole lubricates a tilt plate of the hydraulic pump.

14. The lubricating structure of a hydrostatic continuously variable transmission according to claim 11, wherein the oil path at the outer circumferential side of the clutch valve is an inner ring groove of the transmission shaft.

15. The lubricating structure of a hydrostatic continuously variable transmission according to claim 11, wherein communicating oil path and the lubricant oil ejection hole are formed in the transmission shaft on opposite sides of the clutch valve.

16. The lubricating structure of a hydrostatic continuously variable transmission according to claim 11, wherein the lubricating supplying source includes a central oil path in the transmission shaft, an oil path of an output rotary member, and an outer circumferential annular groove of the transmission shaft.

17. The lubricating structure of a hydrostatic continuously variable transmission according to claim 11, wherein the communicating oil path allows the lubricating oil to flow from an outer circumferential annular groove of the transmission shaft to and inner ring of the transmission shaft, the inner ring of the transmission shaft being the oil path arranged at the outer circumferential side of the clutch valve.

18. The lubricating structure of a hydrostatic continuously variable transmission according to claim 11, wherein the orifice is formed on a downstream side of the communicating oil path.

19. The lubricating structure of a hydrostatic continuously variable transmission according to claim 11, wherein the lubricant oil ejection hole has a diameter larger than a diameter of the orifice.

20. The lubricating structure of a hydrostatic continuously variable transmission according to claim 11, wherein the communicating oil path is formed in a portion of the transmission shaft that is adjacent to a pump cylinder of the hydraulic pump.

* * * * *